Figure 1:
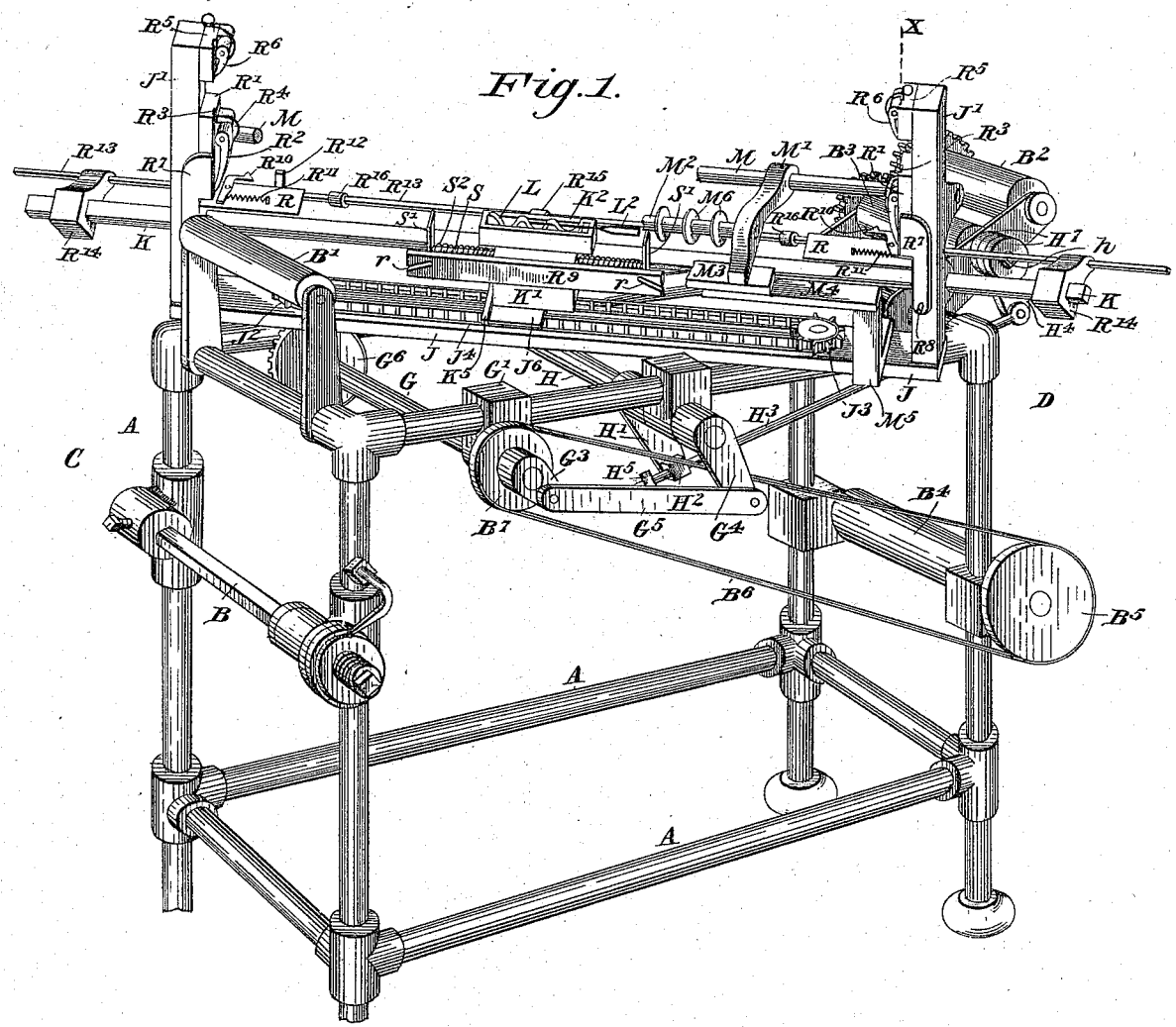

(No Model.)  5 Sheets—Sheet 1.

E. H. POWERS.
CANE WEAVING MACHINE.

No. 568,040.  Patented Sept. 22, 1896.

Witnesses:
B. W. Miller
Guy E. Davis

Inventor,
Edwin H. Powers,
By his Attorneys,
Baldwin Davidson & Wight (No Model.)
5 Sheets—Sheet 2.

E. H. POWERS.
CANE WEAVING MACHINE.

No. 568,040.  Patented Sept. 22, 1896.

Witnesses
B. J. Miller
Guy E. Davis

Inventor,
Edwin H. Powers,
By his Attorneys,
Baldwin Davidson Wight (No Model.)

E. H. POWERS.
CANE WEAVING MACHINE.

No. 568,040.

5 Sheets—Sheet 3.

Patented Sept. 22, 1896.

Witnesses,
B. W. Miller
Guy E. Davis

Inventor,
Edwin H. Powers,
By his Attorneys,
Philison Davidson Wight.

(No Model.) 5 Sheets—Sheet 4.
E. H. POWERS.
CANE WEAVING MACHINE.
No. 568,040. Patented Sept. 22, 1896.
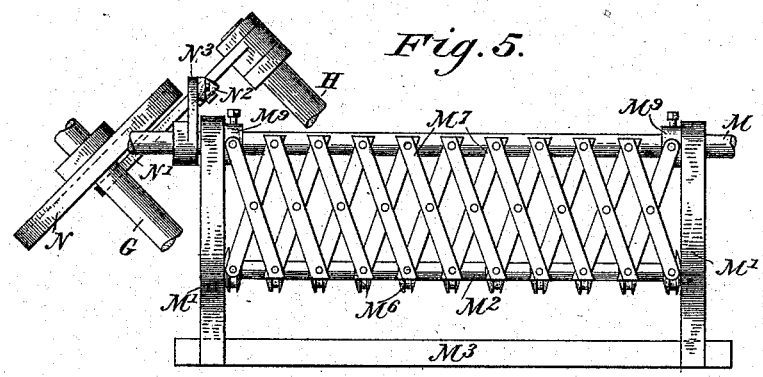
Fig. 5.
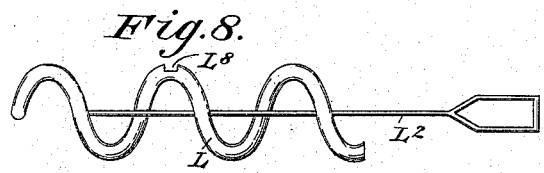
Fig. 6. Fig. 7.
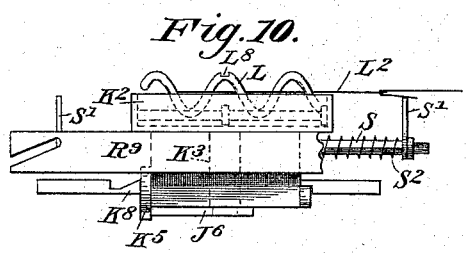
Fig. 8. Fig. 9.
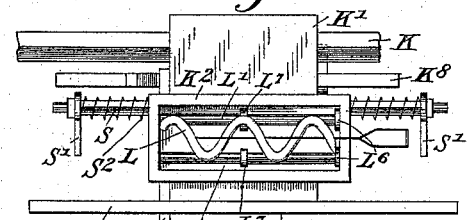
Fig. 10. Fig. 11.
Fig. 12.
Witnesses: Inventor,
B. H. Miller Edwin H. Powers,
Guy E. Davis By his Attorneys,
Baldwin Davidson & Wight
THE NORRIS PETERS CO., PHOTO-LITHO., WASHINGTON, D. C.

(No Model.)  5 Sheets—Sheet 5.

E. H. POWERS.
CANE WEAVING MACHINE.

No. 568,040. Patented Sept. 22, 1896.

Witnesses:
B. W. Miller
Guy E. Davis

Inventor:
Edwin H. Powers,
By his Attorneys,
Baldwin, Davidson & Wight

UNITED STATES PATENT OFFICE.

EDWIN H. POWERS, OF MICHIGAN CITY, INDIANA, ASSIGNOR TO THE CHICAGO CANE SEATING COMPANY, OF SAME PLACE AND CHICAGO, ILLINOIS.

CANE-WEAVING MACHINE.

SPECIFICATION forming part of Letters Patent No. 568,040, dated September 22, 1896.

Application filed May 29, 1896. Serial No. 593,665. (No model.)

*To all whom it may concern:*

Be it known that I, EDWIN H. POWERS, a citizen of the United States, residing at Michigan City, in the county of La Porte and State of Indiana, have invented certain new and useful Improvements in Cane-Weaving Machines, of which the following is a specification.

The object of my invention is to improve the construction, organization, and operation of the mechanism for inserting diagonal strands into cane fabric, shown in Letters Patent of the United States No. 547,449, granted to myself and Eugene Telfair, October 8, 1895. The machine shown in that patent is designed to insert diagonal strands by means of a spiral pirn carried by a shuttle from edge to edge of the fabric and caused to revolve through the meshes thereof by means of notched plates. I find that parts of the mechanism shown in said patent may be somewhat simplified and that the efficiency of the machine may be largely increased by substituting for the notched plates a series of disks engaging the convolutions of the pirn as it is reciprocated across the fabric by the shuttle. I have also found it desirable to change the mechanism for feeding the fabric, as well as the mechanism for feeding the cane from which the diagonal strands are cut. By my improvements I largely increase the output of the machine while improving the quality of the fabric produced.

In the accompanying drawings I have shown a machine organized to operate automatically. Some of my improvements, however, may be used in machines not automatic in all particulars.

The subject-matter deemed novel will be set forth in the claims.

Figure 2:
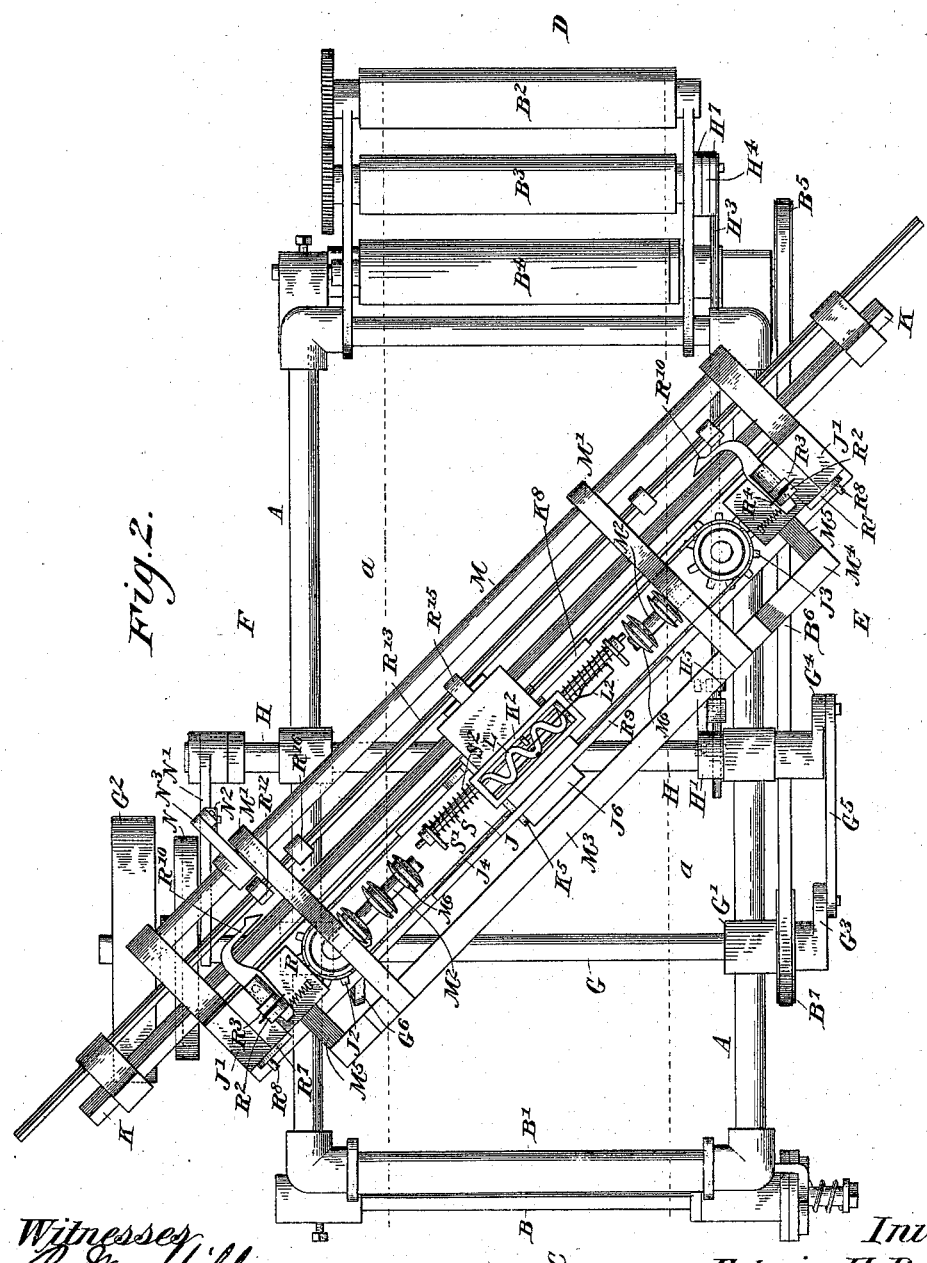
Figure 3:
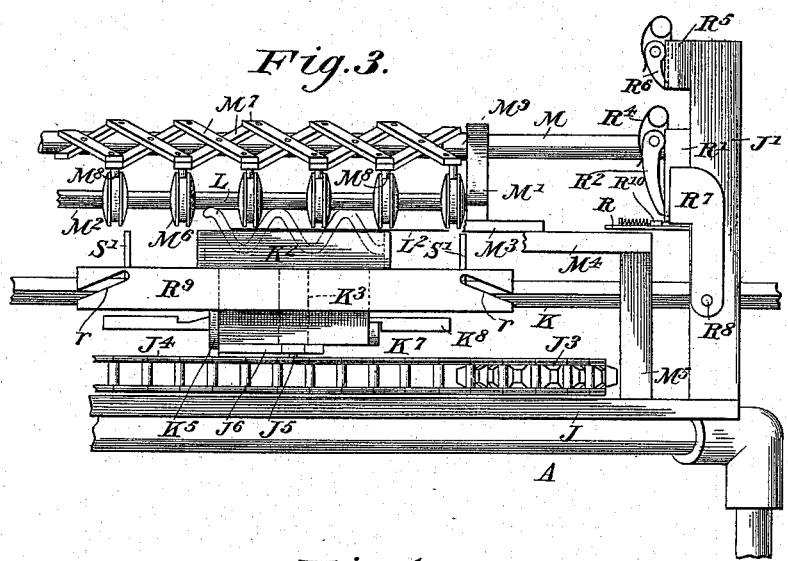
Figure 4:
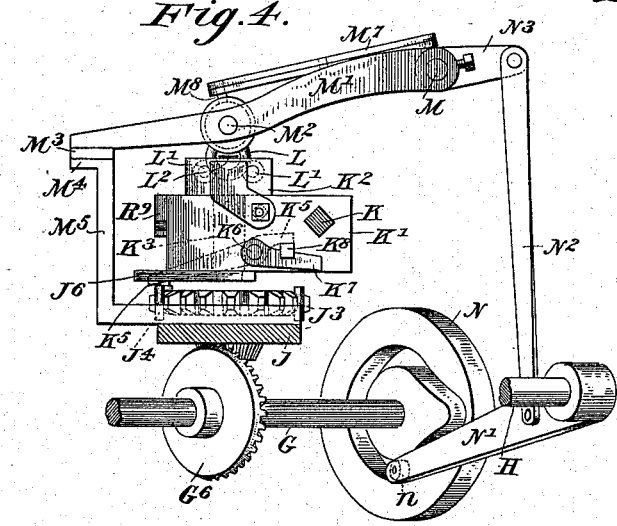
Figure 13:
Figure 14:
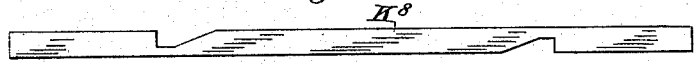
Figure 15:
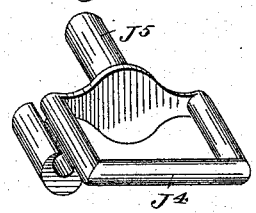
Figure 16:
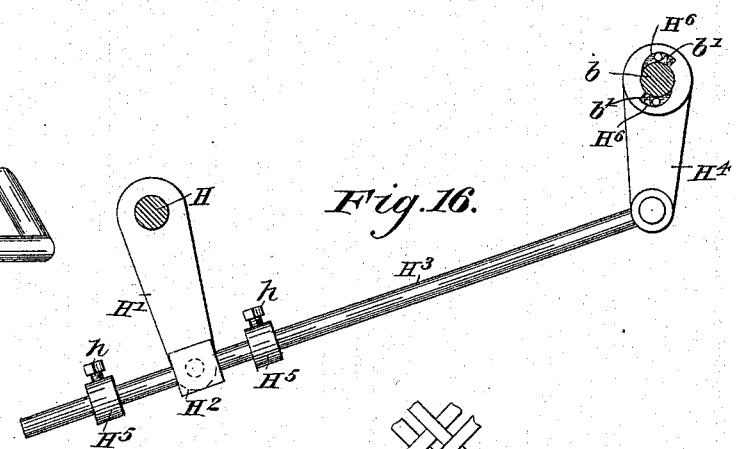
Figure 17:
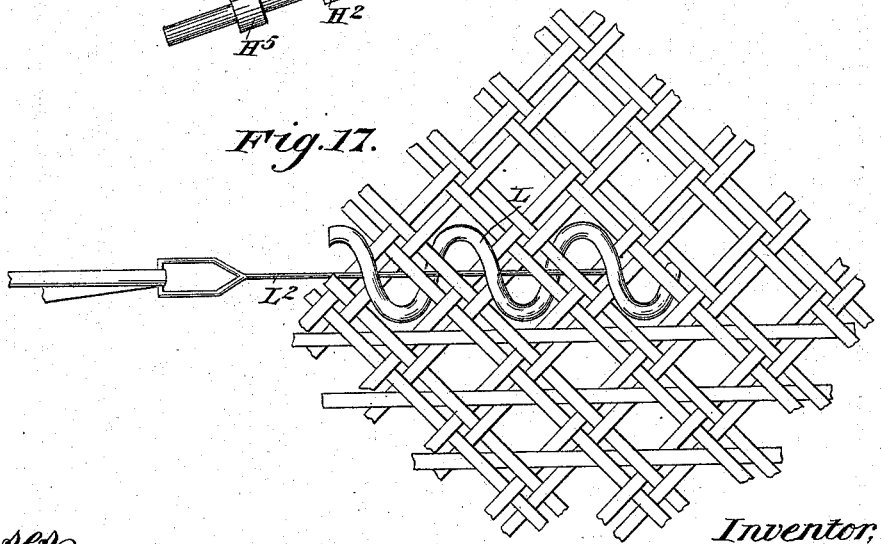

Figure 1 is a perspective view of my improved machine with some of the operative parts removed or broken away to more clearly illustrate other parts. Fig. 2 is a plan view with some of the parts removed or broken away. Fig. 3 is a detail view, on an enlarged scale and in front elevation, of the spiral pirn and the mechanism for actuating it. It also illustrates cane-feeding mechanism at one side of the machine. Fig. 4 is a detail view of the shuttle and some of its attachments and of the clamp-bars and their actuating mechanism. Fig. 5 is a detail view of the disks which engage with the convolutions of the pirn and the mechanism for adjusting them. Figs. 6 and 7 are detail views of the pirn and its attachments, illustrating particularly the relation of the parts at different times. Fig. 8 shows a side elevation of the spiral pirn and the strand-carrier connected therewith. Fig. 9 is an end elevation thereof. Fig. 10 is a detail view, in front elevation, of the shuttle and some of the mechanism carried thereby. Fig. 11 is a plan view of the same. Fig. 12 is an end view thereof. Fig. 13 is a view, on an enlarged scale, of the strand-carrier which is attached to the pirn. Fig. 14 is a detail view of the locking-bar forming part of the mechanism for reversing the motion of the shuttle. Fig. 15 is a detail view, on an enlarged scale and in perspective, of one of the links of the sprocket-chain employed for driving the shuttle. Fig. 16 is a detail view, on an enlarged scale, of part of the mechanism for actuating the cloth-feeding rolls. Fig. 17 shows the manner in which the pirn traverses the meshes of the cloth and lays a diagonal strand therein.

The fabric, composed of warp and weft strands in which the diagonals are to be inserted, is fed longitudinally and horizontally through the machine over the top of the frame A, which may be formed of gas-pipe, as indicated. The fabric, as usual, is wound on a roller carried by a shaft B, which is supplied with suitable tension devices, as indicated, which may be of substantially the same kind as those shown in the Powers and Telfair patent above referred to. The fabric passes from the supply-roll over a guide-roll B' to a feed-roll $B^2$ at the opposite end of the machine. Thence it passes over the top of another feed-roll $B^3$, and then passes downwardly and is wound up upon a take-up roller $B^4$. For the sake of clearness an illustration of the fabric is omitted from the drawings. Its edges, however, are indicated by the dotted lines $a\ a$ in Fig. 2. The front and rear ends of the machine are respectively indicated by the letters C and D, the right and left sides being indicated by the letters E and F.

The driving-shaft G, driven by pulley $G^2$, is arranged transversely and is journaled in blocks G', rigidly attached to the frame A. Upon the right-hand end of the shaft is secured a crank-arm G³, connected by a connecting-rod G⁵ with a crank-arm G⁴, secured to a horizontal rock-shaft H, parallel with the shaft G and journaled in the upper portion of the frame A. The crank-arm G⁴ is of longer radius than the crank-arm G³, so that the continuous revolution of the crank G³ causes the shaft H to rock. An arm H', rigidly secured to the shaft H, extends downwardly therefrom, and at its lower end carries a block H², swiveled to oscillate in a vertical plane. A connecting-rod H³ extends through an aperture in this block, and at its rear end is connected with a crank-arm H⁴, mounted upon the shaft of the feed-roll B³.

Near the forward end of the connecting-rod H³ two collars H⁵ are secured on opposite sides of the block H². The collars may be set at the proper distances apart by means of set-screws h, the arrangement being such that the block H² alternately strikes first one and then the other of the collars as the arm H' is oscillated. The object of this construction is to cause the feed-roll B³ to be turned intermittingly for short distances, there being a suitable interval of time between each actuation, since it is requisite that the feeding movement of the cloth should only occur in the intervals of travel of the pirn across the fabric, which intervals are very brief.

The crank-arm H⁴ is formed with recesses H⁶ adjoining the hole through which the shaft of the feed-roll B³ extends, and in said recesses are arranged cylindrical rollers b, pressed in one direction by springs b'. The form of the recesses is such that when the crank-arm H⁴ is moved in one direction the rollers will be crowded against the shaft, and when moved in the opposite direction they will be released and free, so that the roll B³ will always be driven in one direction. Lateral displacement of the crank-arm H⁴ is prevented by the plates H⁷, mounted on the shaft of the feed-roll B³ and secured in any suitable way.

The take-up roll B⁴ is driven by a belt B⁶, passing around the pulleys B⁵ and B⁷ on the roll-shaft and on the main driving-shaft, respectively. The belt is loose enough to slip upon the pulleys and tight enough at the same time to insure a proper tension to draw the cloth tight. This feed mechanism is found to be most efficient, the oscillation of the arm H' reciprocating the connecting-rod H³, which in turn intermittently turns the feed-roll B³. This roll in turn is geared, as shown, with the roll B². The feed of the cloth may be nicely adjusted by a proper adjustment of the collars H⁵. A plate J extends horizontally across the frame at an angle of forty-five degrees and is securely fastened thereto. At each of its projecting ends the plate J is provided with uprights J', which support part of the mechanism for inserting the diagonal strands. A stiff square bar K is arranged a short distance above the plate J and projects through and beyond the uprights J'. A block K', which I call the "shuttle-block," is mounted upon the bar K and is guided thereby. The shuttle K² is carried by the shuttle-block. It consists of an oblong rectangular metal box, open at the top, and attached to the shuttle-block by means of a short spindle K³, passing vertically through the shuttle-block, the arrangement being such that the shuttle may be revolved on the block when required. The shuttle is reciprocated across the machine by means of a sprocket-chain J⁴, passing around sprocket-wheels J² J³ on opposite sides of the machine.

The sprocket-wheel J² is mounted on the end of a short vertical spindle, which passes downwardly through the plate J and carries upon its lower end a bevel-pinion engaging with a bevel-gear G⁶, fixed on the driving-shaft. The sprocket-chain has one of its links (shown in Fig. 15) provided with an upwardly-projecting stud J⁵, connected with a link-bar J⁶, which projects inwardly between the two turns of the chain and is rigidly connected with the spindle K³ of the shuttle K², the arrangement being such that motion is communicated from the chain to the shuttle, which latter reverses as the stud-link is turned around the sprocket-wheel.

Two levers K⁵ K⁷ are arranged on opposite sides of the shuttle-block. They are pivoted to a horizontal spindle K⁶, passing lengthwise through the block, and they are adapted to engage with a lock-bar K⁸, adapted to slide in the shuttle-block and projecting from opposite ends thereof. The arrangement of these parts is such that when the shuttle-block has reached the end of its travel in either direction the bar K⁸ will strike one of the uprights J' and will be slid in the shuttle-block. The notches formed in the bar K⁸ by alternately engaging the levers K⁵ and K⁷ cause them to alternately be depressed, so as to be engaged by the link-bar J⁶. This construction is intended to cause the shuttle-block to be positively driven by the chain, and the link-bar is released alternately from engagement with the levers to allow it to turn around the sprocket-wheel. The construction and operation of this mechanism are substantially the same as the corresponding mechanism shown in the Powers and Telfair patent above referred to.

The spiral pirn L lies upon two antifriction-rollers L', journaled in the shuttle. The pirn is carried forward bodily in a right line by the shuttle, but is revolved by means, hereinafter described, in such manner as to run spirally through the meshes of the fabric. Preferably the pirn is formed from a round steel rod worked to a spiral form with a pitch to correspond with the meshes of the fabric operated upon. Its forward end is pointed or rounded, in order that it may more readily find its way through the cloth. It is provided with a strand-carrier L², swiveled to a centrally-projecting lug $l$, formed on the pirn near its front end. The lug is so beveled and smoothed as not to obstruct the passage of the pirn through the fabric, and the strand-carrier is swiveled to the pirn, so that the latter may revolve while the former remains non-rotary. Any suitable arrangement may be adopted for this purpose, that shown in the drawings being preferred.

The strand-carrier projects some distance behind the pirn, and its rear end is formed into an oblong eye or loop to receive a cane strand. The rear end of the pirn is cut off at right angles to its axis to expose a flat surface of considerable length. The antifriction-rollers L' are provided at their rear end with flanges $L^6$ and near their middle portions with similar flanges $L^7$, with which latter flanges a groove $L^8$ on the pirn is adapted at times to register, the arrangement being such that the notch $L^8$ will engage with the flanges $L^7$ when the flat rear end of the pirn is removed from the flanges $L^6$. Thus provision is made for causing the pirn to always engage with one or more of the flanges and always be driven forward. The rollers L' support the pirn in such position that its central line is slightly above the top of the shuttle, the strand-carrier L² passing over the end of the shuttle, as clearly shown.

On opposite sides of the fabric are arranged clamp-bars $M^3 M^4$. The bar $M^4$ is supported on standards $M^5$, secured to the plate J. The bar $M^3$ is carried by arms M', projecting from a horizontal shaft M, mounted in bearings in the uprights J'. The arms M' are rigidly secured to the shaft M, extend over the path of the shuttle and pirn, and are oscillated by the mechanism shown in Fig. 4. A crank-arm $N^3$, projecting from the shaft M, is connected by means of a link $N^2$ with an arm N', free to turn on the shaft H, and having a roller $n$, traversing a groove in the cam N on the driving-shaft G. The construction is such that the clamp-bar $M^3$ and the shaft $M^2$, which is carried by the arms M', are elevated and depressed at the proper times to either permit the feeding of the fabric or to hold the fabric steady while a diagonal strand is being inserted. When the shaft $M^2$ is depressed, it rests upon the pirn L, preventing it from rising from its place in the shuttle while being driven forward through the fabric.

The shaft $M^2$ is mounted in suitable bearings in the vertically-oscillating arms M' and carries a series of disks $M^6$, which are preferably made somewhat thicker near their central portion than at their edges. Each disk, as shown, is formed with a circumferential groove, and all of the disks are free to revolve on the shaft. These disks are of such diameter as to reach downwardly to near the central axis of the pirn, and by their contact with the convolutions thereof cause it to revolve while it is being moved forward. By this arrangement friction is reduced to a minimum, as both the shaft and the disks may be revolved very freely. The disks are arranged distances apart to correspond with the meshes of the fabric and the size of the pirn, and as these sometimes vary I have provided means for regulating the position of the disks on their supporting-shaft. Of course the disks could be adjusted singly in well-known ways, but I prefer to adjust them simultaneously, and for this purpose provide a series of levers $M^7$, which are pivoted to each other at their adjoining ends and also centrally where they cross, constituting in fact a series of levers commonly termed "lazy-tongs." At the forward end of each pair of levers is arranged a downwardly-projecting pin $M^8$, which engages a corresponding groove in one of the disks $M^6$. The rear ends of the levers of each end of the series are pivotally connected with two collars $M^9$, which may be adjusted on the shaft M and fixed in any desired position by set-screws.

While the shuttle with the pirn is being drawn across the fabric, the disks $M^6$ engage the convolutions of the pirn, which latter is thereby caused to revolve, the disks and their shaft freely revolving at the same time. When the shuttle has reached the end of its course and the pirn has passed out of the fabric, the clamp-bar $M^3$ and the shaft $M^2$ are elevated by the mechanism before described, and the shuttle is turned around the sprocket-wheel without interference, and an opportunity is given for feeding the fabric forward. The pirn is supplied at the end of each reciprocation with cane, to be inserted diagonally. I employ precisely the same mechanism for this purpose at each end of the diagonal plate J, and in the drawings have correspondingly lettered similar parts. To the inner side of the uprights J' is secured a thin flat horizontal plate R, which is disposed at such a height and projects such a distance toward the center of the machine that when the shuttle at the end of its course is turned the plate R will be just above the projecting portion of the strand-carrier L² and will thereby keep it in a horizontal position. In that portion of the standard J' which is above the plate R is formed a vertical dovetailed groove or raceway, into which is fitted a vertically-movable block R', which carries a pivoted tooth or pawl $R^2$, arranged to press at its free end into a groove $R^3$, formed in the block R'. The pawl is pivoted at its upper end, and its lower end or point is sharpened and is pressed inwardly by a spring $R^4$. A short distance above the block R' is arranged another similarly-grooved block $R^5$, carrying a pivoted downwardly-projecting spring-pressed pawl $R^6$.

The cane-strand, consisting of comparatively short strips glued together and fed from a reel, is passed downwardly through the grooves in the blocks R' and $R^5$, its course being indicated by dotted lines X in Fig. 1. The blocks R' and $R^5$ are similar in construction, the block R', however, being movable vertically, while the block R⁵ is stationary. At each vertical reciprocating movement of the lower block the cane-strand is fed downward for a short distance. During its upward movement the pawl R² slips backward over the cane, which is then held by the pawl R⁶, acting as a detent. The cane-strand, however, may at all times be freely pulled forward through the grooves past the pawls. It passes from the block R', through a hole in the plate R, directly under the groove R³. The block R' on each side is raised and lowered by a plate R⁷, carrying at its lower end a stud R⁸, arranged to be engaged with a cam-slot $r$ in the end of a bar R⁹, secured to the shuttle-block K' and carried back and forth therewith, the arrangement being such that when the shuttle has reached the end of its course in either direction one of the bars will be elevated by the engagement of the cam-slot with the pin R⁸, and as the shuttle commences its return movement the block R' will be depressed by the same means. At this time the open end of the strand-carrier is directly below the hole in the plate R, its rear end projecting beyond the hole. The cane-strand is then pushed down through the forward portion of the eye and is fully fed downward before the rear end of the eye has passed the hole.

A horizontal bar S, preferably square, extends through the shuttle-block K' and carries at each end a plate S', extending upwardly nearly as high as the strand-carrier L², its upper edge being horizontal and somewhat wider than the eye in the strand-carrier. The bar S is normally so disposed that one of its plates S' shall be behind the rear end of the strand-carrier each time that it traverses the fabric. The bar S is free to move in either direction, but is normally held in the position just described by means of springs S². The length of the bar S is such that when the shuttle has reached the end of its course the bar will have been pushed by contact with one of the standards J' into such a position that the eye of the strand-carrier will extend beyond the plate S'. Therefore the plate S' can never travel as far as the hole in the plate R, above described, and the cane-strand will always be fed down, while the eye of the strand-carrier projects beyond the plate S'. When the shuttle has retreated far enough, the plate S' will, by the action of the spring S², be returned to its normal position, thereby folding the end of the cane-strip under the rear end of the eye of the strand-carrier, as shown in Fig. 17. In this manner the cane-strand is prevented from being pulled away from the eye until it has been drawn into the fabric, when the strands of the fabric effectively prevent the diagonal strand from becoming disengaged until the pirn has reached its opposite side. The strand is then freed from the strand-carrier, being no longer held folded, and the plate S' being pushed by the engagement of the opposite end of the bar S with the opposite standard J' backwardly, so that the short end of the folded strand is at once disengaged from the eye of the strand-carrier.

When the pirn has drawn a sufficient length of cane forward with it to form one diagonal, the strand is severed by means of a shear-blade R¹⁰, centrally pivoted upon the plate R and adapted to move across the hole in said plate and thus sever the strand. The shear-blade R¹⁰ is normally retracted by a coiled spring R¹¹, attached to a pin on top of the plate R. The outer end of the blade is bent at right angles and is provided with a beveled rearwardly-projecting tooth which is arranged to be engaged for momentarily closing the shear at proper times with a stud R¹², secured by a set-screw or otherwise to a horizontal square rod R¹³, movably mounted in fixed bearings R¹⁴ on the bar K. To the rear side of the shuttle-block is secured an arm R¹⁵, which embraces and slides loosely upon the bar R¹³ and is arranged to slide said bar at proper times by striking collars R¹⁶, adjustably secured to the rod R¹³. The collars R¹⁶ are adjusted to cut off the cane-strands to proper lengths to accommodate the various widths of fabric upon which the machine operates.

It is obvious that some parts of the mechanism may be varied, but I have shown in connection with my improvements the best ways now known to me of performing all the operations in the most approved manner in an automatic machine.

I claim as my invention—

1. In a cane-weaving machine, the combination, substantially as set forth, of a spiral pirn provided with cane-carrying devices, a shuttle for carrying the pirn, means for reciprocating the shuttle across the fabric, means for holding the pirn in the shuttle, and rotary disks with which the convolutions of the pirn engage.

2. In a cane-weaving machine, the combination of a spiral pirn provided with cane-carrying devices, a shuttle for carrying the pirn, means for reciprocating the shuttle across the fabric, a rotary shaft for holding the pirn in the shuttle and rotary disks carried by the shaft engaging the convolutions of the pirn to cause it to rotate while reciprocating.

3. In a cane-weaving machine, the combination of a spiral pirn provided with cane-carrying devices, a shuttle for carrying the pirn, means for reciprocating the shuttle across the fabric, clamp-bars for holding the fabric steady during the reciprocation of the pirn, a rotary shaft for holding the pirn in the shuttle, means for causing the pirn to rotate while reciprocating, and means for opening the clamp and lifting the rotary shaft simultaneously at the end of each reciprocation of the shuttle.

4. In a cane-weaving machine, the combination of a spiral pirn provided with cane-carrying devices, a shuttle for carrying the pirn, means for reciprocating the shuttle across the fabric, means for holding the pirn in the shuttle, the rotary disks engaging with the convolutions of the pirn to cause it to rotate while reciprocating, and means for adjusting the positions of the disks.

5. In a cane-weaving machine, the combination of a spiral pirn provided with cane-carrying devices, a shuttle for carrying the pirn, means for reciprocating the shuttle across the fabric, rollers in the shuttle on which the pirn rests provided with flanges at their rear ends with which the rear end of the pirn engages, and near their central portions with flanges adapted to engage a notch in the pirn, means for holding the pirn in the shuttle, and devices for causing the pirn to rotate while reciprocating.

6. In a cane-weaving machine, the combination of a spiral pirn provided with cane-carrying devices, a shuttle for carrying the pirn, means for reciprocating the shuttle across the fabric, the disks engaging the convolutions of the pirn, and devices for adjusting the disks simultaneously.

7. In a cane-weaving machine, the combination of a spiral pirn provided with cane-carrying devices, a shuttle for carrying the pirn, means for reciprocating the shuttle across the fabric, circumferentially-grooved disks engaging the convolutions of the pirn, the lazy-tongs levers having pins engaging the grooves of the disks, and means for adjusting the lazy-tongs levers.

8. In a cane-weaving machine, the combination of a spiral pirn provided with cane-carrying devices, a shuttle for carrying the pirn, means for reciprocating the shuttle across the fabric, mechanism for causing the pirn to revolve while traversing the fabric, the slotted plate carried by the shuttle, a vertically-reciprocating plate having a stud with which the slot engages, and a block connected with said vertically-reciprocating plate and carrying a pawl for feeding the cane.

9. In a cane-weaving machine, the combination of the shuttle, means for reciprocating it, cane-carrying devices connected therewith, means for feeding cane to the cane-carrying devices, the pivoted shear-blade, a bar reciprocating with the shuttle, an adjustable collar on said bar, and a stud on the bar engaging intermittingly with the shear-blade.

In testimony whereof I have hereunto subscribed my name.

EDWIN H. POWERS.

Witnesses:
   FRANK OSBORN,
   E. J. POWELL.